March 25, 1941.      J. H. WALD      2,235,909
SHIELDING HOLDER FOR FRUIT
Filed April 15, 1940
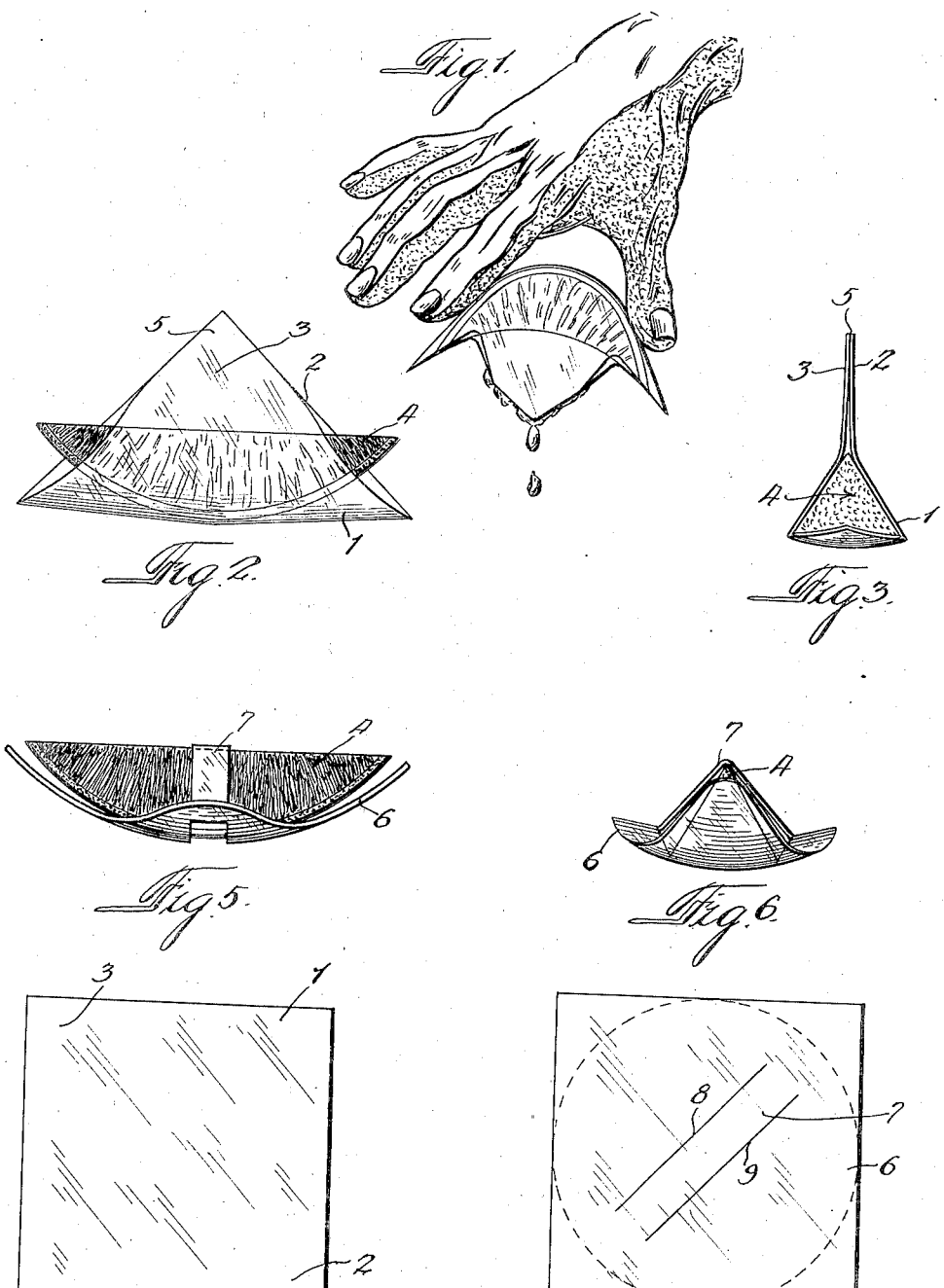

Patented Mar. 25, 1941

2,235,909

UNITED STATES PATENT OFFICE 2,235,909

SHIELDING HOLDER FOR FRUIT

Julius H. Wald, Chicago, Ill.

Application April 15, 1940, Serial No. 329,721

9 Claims. (Cl. 100—49)

This invention relates to packaging and more particularly to a flexible shielding holder for citrus fruit slices, which permits manipulation of the contents of the holder while dispensing.

In the use of certain fruits and more particularly citrus or other juice bearing fruits such as are commonly employed for flavoring purposes, it has become common practice, particularly when served in the form of slices or wedges, for the user to manually grasp the wedge on the rind portion adjacent the ends thereof by the thumb and forefingers, and by squeezing the two ends together, extract the juice from the slice. A familiar example of the above is the addition of lemon or the like to tea or other beverages for flavoring the same.

However, this method of extracting juice has generally been unsatisfactory. It is common knowledge that when extracting juice in this manner it is impossible to prevent lateral dispersion of uncontrolled spurts of juice, resulting from the sudden rupture of minute cells of the fruit slice, to the great inconvenience and embarrassment of both the user and those in the vicinity.

Other undesirable incidents of the above described prior method of extracting such juices are the necessity for actual manual contact with the slice, the difficulty in shielding the open sides of the slice, the difficulty in handling the slice by its peel portion only, which latter is ordinarily slippery and difficult to grasp, and the rapidity with which the wedge will dry out and lose its moisture before use. Also, the large exposed moist sides of these wedges necessarily present a ready settling place for dust and air-borne germs of all kinds. Ample opportunity for contamination is afforded by the usually prolonged period that the surfaces of these wedges are exposed to the air before use. Thus the present use of such slices is not only unclean, but highly unsanitary.

The present invention successfully overcomes the above enumerated difficulties and in addition embodies a number of advantages which result only from the use of this device, such for example as the preservation of the slice ready for use within a transparent moisture proof package whereby the period of freshness of the slice is materially prolonged, the provision of a portion of the container which may constitute a handle to facilitate use, and the use of wrapper material which is far less slippery than the rind of the fruit, permitting a far better grasp of the wedge by the user.

In addition it has been found that increased sanitation and cleanliness resulting from the use of this invention is an important benefit. By using this invention, large resturants and the like may keep a large supply of prepared wedges on hand for a maximum period of time, with a minimum risk of contamination and depreciation.

Finally, the wrappers form a shield which confines the juice as it is extracted from the fruit and permits accurate control during the dispensing operation. This is an important feature as it eliminates the necessity that the user employ both hands, as has heretofore been customary, one to manipulate the wedge and the other as a somewhat inefficient shield to protect against lateral dispersion of the juice.

With the present invention the user may satisfactorily manipulate the wedge with one hand and still keep the wedge shielded. In addition, means are provided to augment the rate of flow of the juice and make it even more readily available to the user.

It is, therefore, an object of the present invention to provide a holder having the above enumerated desirable characteristics and which may easily, cheaply and simply be constructed out of readily available materials with a minimum of time and effort.

Other objects and advantages will be hereinafter more fully described and for a complete understanding of the nature, scope and characteristics of this invention reference may now be had to the following description and accompanying drawing, in which latter:

Fig. 1 is a perspective view of the present invention in use.

Fig. 2 is a side elevation of a wrapper embodying the instant invention.

Fig. 3 is an end elevation of the wrapper illustrated in Fig. 2.

Fig. 4 is a plan view of a blank which may be employed in making the embodiment illustrated in Figs. 1, 2 and 3.

Fig. 5 is a side elevation of a slightly different wrapper showing an optional embodiment of the present invention.

Fig. 6 is an end view of the embodiment illustrated in Fig. 5.

Fig. 7 is a plan view of the blank which may be employed in making the wrapper illustrated in Figs. 5 and 6.

The embodiment illustrated in Figs. 1, 2, 3 and 4 comprises a sheet 1 which may be of the general contour illustrated in Fig. 4, and has portions 2 and 3 occupying diagonally opposite corners. This sheet 1 may be of any suitable material such as paper, cloth, metal foil, or other materials having the desired characteristics. In both of the embodiments illustrated, Cellophane, or "pliofilm" is shown employed because of its transparent and moisture resisting characteristics. It is desirable that the material employed be sufficiently flexible to permit ready compression of the contents of the wrapper, therefore a somewhat thin material is preferred. It is obvious that other suitable materials may be selected if desired without departing from the spirit of this invention.

The opposite corners of the wrapper 1 may be placed together and secured by any suitable means such, for example, as the application of heat which will cause the Cellophane surfaces to adhere to each other, as is known in the art, or if desired, a suitable adhesive may be employed. It will be observed that with the corners 2 and 3 secured together the wrapper forms a holder or cradle having open ends and into which a sector of fruit may be inserted. When in place the freshly cut sides of the sector will be in intimate contact with the wrapper. When positioned in this manner it will be clear that the major opposed portion of the pulp is covered by the wrapper which, by the slight moisture of the sliced surface, is retained in intimate contact therewith to exclude air, thereby keeping the wedge from drying out and excluding dust, germs, and foreign material.

When placed together the diagonally opposed corners of the blank form a convenient handle 5 by which the wrapper and its contents may easily be carried.

The embodiment illustrated in Figs. 5, 6 and 7 comprises a device similar to the above, but wherein the blank 6 (Fig. 7) is provided with a central strap 7 formed out of the blank by a pair of parallel slits 8 and 9 which may be diagonally disposed on the blank as shown. To eliminate protruding corners the blanks forming either of these embodiments may have any of their corner portions trimmed, as shown by dotted lines in Fig. 7.

The strap 7 of the second embodiment may be raised and the sector inserted thereunder, as shown in Figs. 5 and 6. In this embodiment the wrapper is retained in place by the strap, and the remainder of the wrapper lies over the peel of the sector.

It will be apparent that the strap 7 and the secured portions 2 and 3 perform an additional function for when the ends of the peel are squeezed together, they are drawn into the pulp, serving to sever the surface thereof, and initiate the flow of juice. This likewise prevents lateral dispersion of the juice by providing openings through which the juice flow may start.

It will be apparent that with the present invention uncontrolled spurts of juice are effectively eliminated. The freshly cut surfaces of the pulp are shielded by the wrapper and when the sector is squeezed the laterally directed spurts of juice strike the shield and run downwardly in a controlled stream. Fig. 1 shows how the juice is collected by the wrapper and led downwardly.

In addition to the above it will be apparent that applicant's invention is a material improvement in the method of preserving and serving food stuffs. By this invention not only is the original freshness and flavor retained, but introduction of foreign material is prevented. Of course, the wrapper may bear upon its outer face an artistic design or advertisement which may be in colors, if desired.

From the foregoing description it will be apparent to those skilled in the art that various modifications thereof may be made without departing from the spirit and scope of this invention and it is desired, therefore, that the same be limited only by the scope of the prior art and the appended claims.

Having thus described the invention, what is claimed and desired to be secured by Letters Patent is:

1. A shielding holder for a spherical sector of a fruit having a flexible rind and a juicy pulpy interior, comprising a sheet member of thin flexible transparent material shaped to provide a gripping and shielding member to engage the ring substantially from tip to tip of the sector, and means engageable with the pulp for holding said shielding member in position on the sector, said pulp-engaging means and shielding member together extending completely around the middle portion of said sector.

2. A shielding holder for a spherical sector of a fruit having a flexible rind and a juicy pulpy interior comprising a sheet member of thin flexible material shaped to provide a gripping and shielding portion to engage the rind substantially from tip to tip of the sector, and two portions extending from opposite sides of said gripping portion engageable with the sides of the pulp of the sector and secured together to embrace the pulpy material for holding the shielding portion in position on the sector, said shielding portion and two pulp-engaging portions together extending completely around the middle portion of said sector.

3. A shielding holder for a spherical sector of a fruit having a flexible rind and a juicy pulpy interior comprising a sheet member of thin flexible material shaped to provide a gripping and shielding portion to engage the rind substantially from tip to tip of the sector, and two portions extending from opposite sides of said gripping portion engageable with the sides of the pulp of the sector and secured together to snugly embrace the pulpy material for holding the shielding portion in position on the sector, said shielding portion and two pulp-engaging portions together extending completely around the middle portion of said sector, whereby when the ends of the holding portion are pressed toward each other the embracing portions of the sheet will cut into the pulp to free the juice.

4. A shielding holder for a spherical sector of a fruit having a flexible rind and a juicy pulpy interior, comprising a sheet member of thin flexible material shaped to provide a gripping and shielding member to engage the rind substantially from tip to tip of the sector, and means engageable with the pulp for holding said shielding member in position on the sector, said pulp-engaging means and shielding member together extending completely around the middle portion of said sector.

5. A flexible wedge shield for self retaining positioning about a fruit sector comprising a sheet of flexible moisture proof material having four corners, a diagonally disposed pair of said corners being secured together to form an enclosure open at both ends whereby a sector of fruit may be inserted endwise within said enclosure, whereby said sector can be manipulated through said sheet to extract juice therefrom.

6. A wrapper for a sector of fruit having a rind portion and a juicy pulp portion comprising a sheet of flexible material, a strap forming a portion of said material and adapted for partial separation therefrom to form an opening between the strap and the body of the sheet into which a sector of fruit can be inserted, with the strap adjacent the pulp, said strap being positioned to be drawn into the pulp as the ends of the sector are drawn together.

7. A shielding holder for a spherical sector of a fruit having a flexible rind and a juicy pulpy interior comprising a sheet member of thin flexible material shaped to provide a gripping and shielding member to engage the rind substantially from tip to tip of the sector, and means engageable with the pulp for holding said shielding member in position on the sector, said pulp-engaging means and shielding member together extending completely around the middle portion of said sector and therebeyond, whereby when the pulp is squeezed the flow of juice therefrom is positively conducted downwardly.

8. A shielding holder for a spherical sector of a fruit having a flexible rind and a juicy pulpy interior, comprising a sheet member of thin flexible material shaped to provide a gripping and shielding member to engage the rind substantially from tip to tip of the sector, and means engageable with the pulp for holding said shielding member in position on the sector, said pulp-engaging means and shielding member together extending completely around the middle portion of said sector and said shielding member and pulp-engaging means being formed of an integral sheet.

9. A flexible wedge shield for self retaining positioning about a fruit sector comprising a sheet of flexible moisture proof material having four corners, a diagonally disposed pair of said corners being secured together to form an enclosure open at both ends whereby a sector of fruit may be inserted endwise within said enclosure, whereby said sector can be manipulated through said sheet to extract juice therefrom, the peripheral edges of said diagonally-disposed corners being juxtaposed.

JULIUS H. WALD.

CERTIFICATE OF CORRECTION.

Patent No. 2,235,909. March 25, 1941.

JULIUS H. WALD.

It is hereby certified that error appears in the printed specification of the above numbered patent requiring correction as follows: Page 1, second column, line 4, for "resturants" read --restaurants--; page 2, second column, line 19, claim 1, for the word "ring" read --rind--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.